United States Patent [19]

Sukhobrusov et al.

[11] 4,155,830
[45] May 22, 1979

[54] FILTER PRESS

[76] Inventors: Pavel N. Sukhobrusov, ulitsa Vyrobnycha, 23; Ivan S. Ermakov, prospekt Pravdy, 7, kv. 44; Alexei I. Lapin, ulitsa Kandaurova, 3, kv. 6; Mikhail Y. Meshengisser, ulitsa Sumskaya, 126, kv. 5, all of Kharkov, U.S.S.R.

[21] Appl. No.: 771,548

[22] Filed: Feb. 24, 1977

[51] Int. Cl.² .............................................. B01D 25/34
[52] U.S. Cl. ..................................... 210/225; 210/230
[58] Field of Search ............... 210/400, 225, 350, 229, 210/224, 227, 228, 230, 231; 100/115

[56] References Cited

U.S. PATENT DOCUMENTS

| 3,075,333 | 1/1963 | Revell | 210/400 |
|---|---|---|---|
| 3,342,123 | 9/1967 | Ermakov et al. | 100/115 |
| 3,583,566 | 6/1971 | Meshengisser et al. | 210/225 |
| 3,613,563 | 10/1971 | Meshengisser et al. | 210/225 |
| 3,637,082 | 2/1972 | Bentzien | 210/225 |
| 3,767,052 | 10/1973 | Shibasaki | 210/400 |
| 3,807,567 | 4/1974 | Iwatani | 210/225 |

Primary Examiner—Charles N. Hart
Assistant Examiner—David R. Sadowski
Attorney, Agent, or Firm—Steinberg & Blake

[57] ABSTRACT

A filter press comprises a support plate and a pressure plate and a set of chamber-type filter plates arranged therebetween. Each filter plate is provided with a cloth filtering barrier in the form of an endless belt which is supported by two rollers fastened to two opposite walls of the filter plate in such a manner that both runs of the belt extend on the side of a draining barrier of the filter plate. There are provided two bars for displacement of the filtering barriers extending along the set of the filter plates on opposite sides of the set, the bars having a drive for their concurrent transverse reciprocation, and there are also provided rods which are fixed to each endless belt to extend transversally thereof and movable along and together with the bars in transverse direction relative to the set of the filter plates.

2 Claims, 6 Drawing Figures

FILTER PRESS

The invention relates to the equipment for separation of suspensions, and more particularly to filter presses with mechanized removal of precipitate.

Known in the art is a filter press comprising a set of vertically extending filter plates and frames which are alternately stacked and accommodated between a support plate and a pressure plate connected to each other by means of a mechanism for clamping the set of filter plates and frames.

The filter plate comprises a plate having two draining surfaces, that is both sides of the plate are provided with ridges enabling an unobstructed flow of filtrate to the draining passage of the filter plate. The plate portions having a ridged surface are limited along the perimeter by a flat limiting surface in the form of a belt.

The inner space of the filter frames communicates with a passage for feeding suspension. Limiting surfaces identical in shape and dimensions with the limiting surfaces of the filter plates are provided along the perimeter of each filter frame on the sides thereof facing the filter plates, the limiting surfaces serving for clamping a filtering barrier therebetween. The filtering barrier is formed as endless belts of filtering cloth, each belt embracing one of the filter plates and being supported by rollers fixed to two opposite (top and bottom) walls of the filter plate. One of the rollers, preferably the upper roller is connected to a rotary drive for displacing the filtering cloth for removal of precipitate.

The above-described arrangement of the filtering cloth in the filter press cannot, however, provide for reliable removal of precipitate therefrom. Precipitate is concurrently removed from both runs of the endless belt so that precipitate is removed downwardly from one run of the endless belt and upwardly from the other run of the belt, and it is rather difficult to ensure complete removal of precipitate from the run moving upwards because in this case the positive folding action of the roller on the filtering cloth and force of gravity from precipitate cannot be used; nor it is possible in this case to provide for good regeneration of the filtering cloth. In addition, during the removal of precipitate the filtering cloth slides over the driven roller.

The latter disadvantage is eliminated in a filter press, wherein, in order to prevent sliding of the filtering cloth, it is provided with perforated strips fixed to marginal portions thereof for engagement with sprockets rigidly secured to the driven rollers. A splined drive shaft extends along the entire length of the set of filter plates and frames and is connected to a rotary drive. The shaft is connected to each driven roller by means of a pair of bevel gears.

This arrangement is rather complicated and does not provide a filter press having large filtering surface due to limited strength and rigidity of the drive shaft whose length increases with an increase in the length of the filter press.

In addition, since the pattern of arrangement of filtering cloth is the same in both above-described filter presses, the disadvantages indicated with reference to the first-mentioned filter press are also inherent in the second-mentioned filter press.

The above disadvantages are eliminated in a filter press comprising a support plate and a pressure plate, and a set of chamber-type filter plates each comprising a frame accommodating a solid barrier and a filtering barrier. The chamber between the barriers is connected to a passage for draining filtrate. Rollers are fixed to two opposite walls of the filter plate, and a filtering barrier is supported by the rollers to extend between the filter plates, the filtering barrier comprising an endless belt made of filtering cloth which is common for the whole filter press. The filter plate has a pipe for feeding suspension to the space between the filtering barrier and the solid barrier of the adjacent filter plate. The filter press is provided with a mechanism for clamping the set of filter plates, as well as with a mechanism for displacing the filtering barrier for removing precipitate.

Displacement of the filtering barrier and removal of precipitate are effected due to displacement of the filter plate along the filter press. During this displacement, the filtering barrier which covers the filter plate in two plies on the side of the draining barrier is drawn over the lower roller on which the precipitate is separated from the filtering barrier, the belt being turned with its contaminated side facing the draining barrier.

This filter press can have a large filtering surface as compared with the above-described filter presses and provides for reliable removal of precipitate.

It is, however, noted that after removal of precipitate, at the beginning of the next filtering cycle, filtrate regenerates the filtering barrier and is contaminated with particles remaining in the filtering barrier so that first batches of filtrates obtained after the removal of precipiate should be recycled for re-filtering.

It is an object of the invention to provide a simple filter press having a large filtering surface which combines reliable removal of precipitate with production of clean filtrate which does not require re-filtering.

Another object of the invention is to provide a filter press featuring efficient regeneration of a filtering barrier.

The above objects are accomplished in that in a filter press comprising a support plate and a pressure plate, a set of chamber-type filter plates arranged therebetween, each filter plate comprising a frame having a solid barrier and a draining barrier secured to the sides thereof, the chamber between the barriers communicating with a passage for draining filtrate, a flexible liquid-permeable fabric filtering barrier extending between the filter plates which is supported by rollers fixed to two opposite walls of the filter plates, pipes for feeding suspension to spaces between the filtering barrier and solid barries of adjacent filter plates, as well as mechanism for clamping the set of the filter plates and a mechanism for displacing the filtering barrier. According to the invention, the filtering barrier is formed by endless belts each belonging to one of the filter plates, both runs of the belt extending on the side of the draining barrier of the filter plate, and the mechanism for displacing the filtering barrier comprises two bars extending along the set of the filter plates on two opposite sides thereof, the bars having a drive for their concurrent reciprocation transversally of the set of the filter plates, as well as rods fixed to one run of each endless belt to extend transversally thereof and to co-operate with the bars in such a manner as to slide with their ends along and move together with the bars in transverse direction relative to the filter plates.

The filter press according to the invention is simple in structure, ensures reliable removal of precipitate from the filtering barrier because the drive for displacing the endless belts is directly connected to the filtering barriers which are displaced, thereby providing removal of precipiate. As the filtering barrier is contaminated, it is regenerated by turning each of the belts so that its contaminated side faces the draining barrier of a respective filter plate and by passing regenerating liquid therethrough using the same passages as for feeding suspension during filtering. As a result of efficient regeneration and due to the fact that the filtering is every time effected through a predetermined (one and the same) portion of the filtering barrier, filtrate thus obtained is clean and contains only a minor percentage of solid phase.

The invention will now be described in details with reference to a preferred embodiment thereof illustrated in the accompanying drawings, in which:

FIG. 1 diagrammatically shows the filter press according to the invention;

Figure 1:
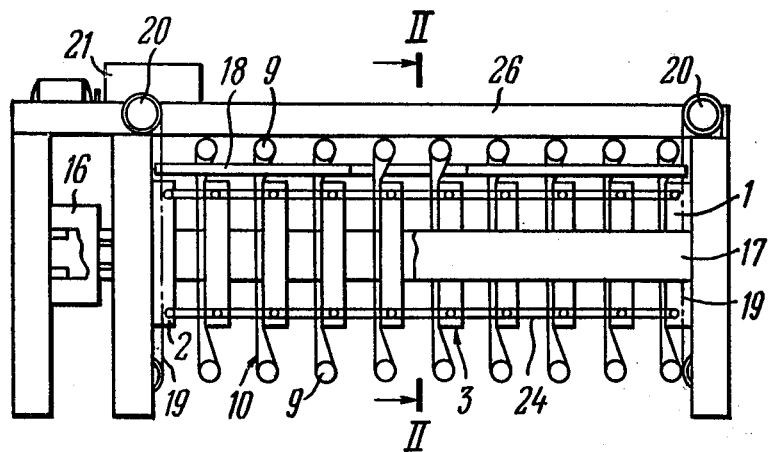
Figure 2:
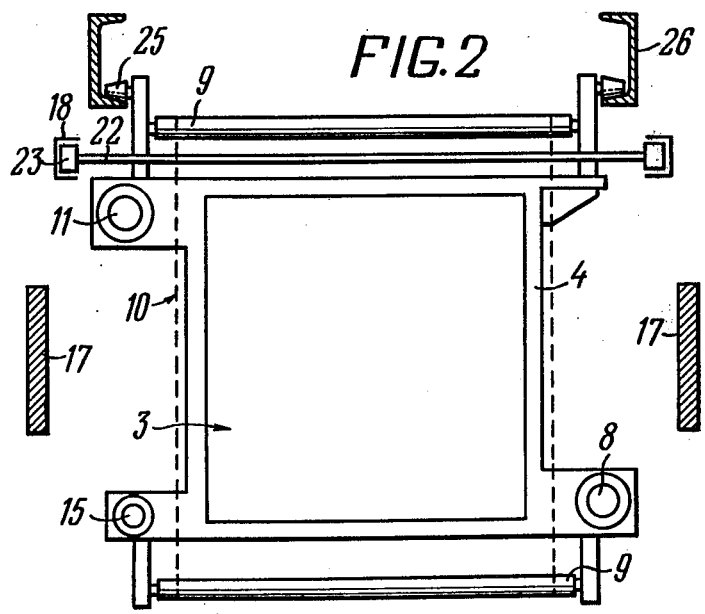
FIG. 2 shows a sectional view taken along the line II—II in FIG. 1, with the filtering barrier removed and shown with dotted line.

The filter press comprises a support plate 1 (FIG. 1) and a pressure plate 2, and a set of chamber-type filter plates 3 is arranged between the two plates. Each filter plate 3 comprises a frame 4 (FIG. 2) accommodating a solid barrier 5 (FIG. 3) and a draining barrier 6. The chamber 7 between the barriers 5 and 6 communicates with a passage 8 (FIG. 4) for draining filtrate.

Rollers 9 (FIGS. 2, 4) are fixed to two opposite walls of the filter plate 3 to support a cloth filtering barrier made in the form of an endless belt 10 having both runs 10a and 10b extending on the side of the draining barrier 6 of the filter plate 3 by whose rollers 9 it is supported.

Figure 5:
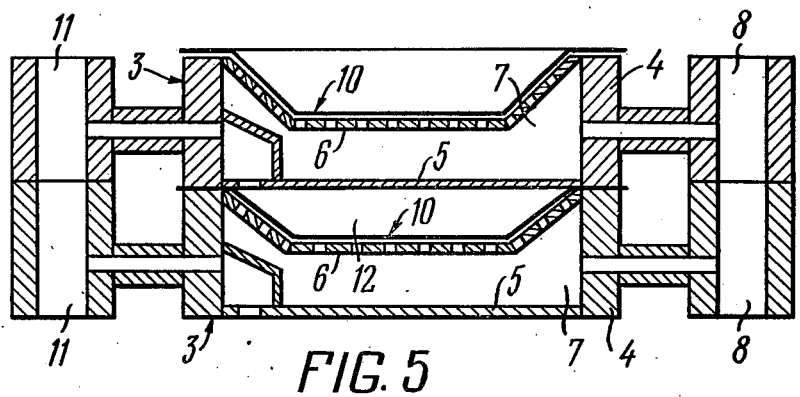
FIG. 5 is a sectional view of two filter plates in the assembled state.
Figure 3:
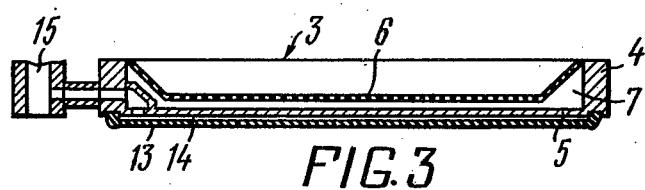
FIG. 3 is a sectional view of the filter plate.
Figure 4:
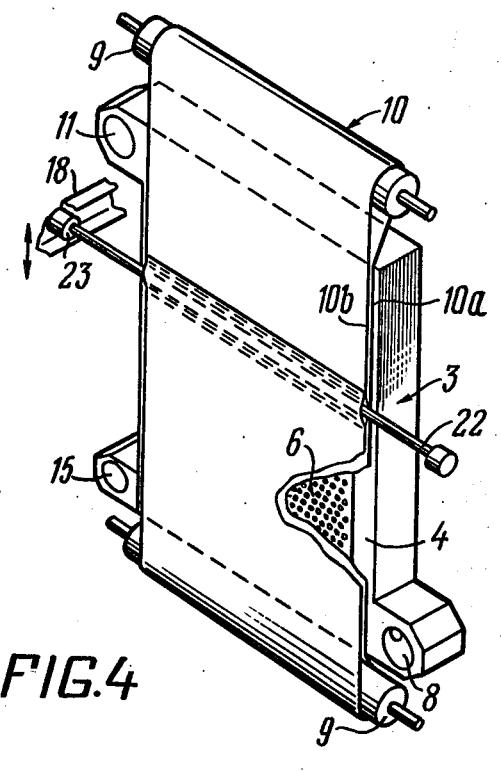
FIG. 4 shows the filter plate with the filtering barrier according to the invention, partially in section.

Each filter plate 3 is provided with pipes 11 for feeding suspension to a space 12 (FIG. 5) between the filtering barriers 10 and the solid barriers 5 of adjacent filter plates 3. Each filter plate 3 may have a flexible membrane 13 (FIG. 3) arranged on the side of the solid barrier 5. A chamber 14 between them is connected to a passage 15 (FIGS. 3, 4) for feeding liquid or gas to the chamber 15. The flexible membrane 13 is used for squeezing precipitate (FIG. 3).

The filter press is provided with a mechanism for clamping the set of the filter plates 3 comprising a hydraulic cylinder 16 (FIG. 1) having its piston rod connected to the pressure plate 2 and the housing connected to the support plate 1 by means of bearing beams 17 extending on either side of the filter press.

Figure 6:
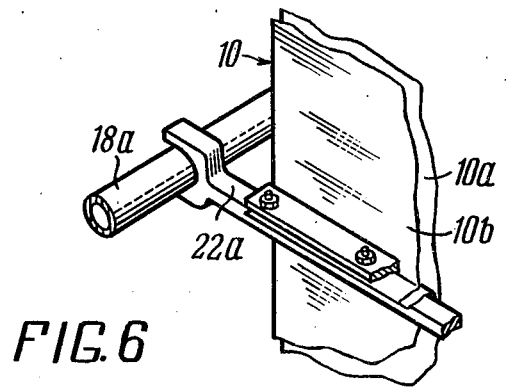
FIG. 6 shows an embodiment of the rod and bar according to the invention.

The filter press also has a mechanism for displacing the filtering barriers comprising two bars 18 (FIGS. 1, 2) extending along the set of the filter plates 3 on two opposite sides thereof, the bars being connected, by means of chains 19 (FIG. 1) and drive shafts 20, to a drive 21 for concurrent reciprocation of the bars 18 transversally of the filter plates 3. A rod 22 is fixed to and extends transversally of one run of the endless belt 10, preferably of the outer run 10b (FIG. 4) thereof relative to the filter plate 3 on whose rollers 9 it is supported. The rod 22 of endless each belt 10 is connected to the bars 18 for free displacement along the bars 18 during clamping and unclamping of the filter plates 3. For that purpose, the bar 18 is of a box-shaped cross section and has a slot receiving cylindrical attachments 23 secured to the ends of the rods 22. Alternatively, the bars may be of round section as shown at 18a (FIG. 6) or of any other shape and may co-operate with the rods 22a in such a manner as to provide for an unobstructed movement of the rods 22a along the bars 18a. This manner of connection of the bars 18a and rods 22a, as well as bars 18 and rods 22 (FIG. 4), also provides for displacement of the endless belts 10 together with the bars 18 in transverse direction relative to the filter plates 3.

The filter plates 3 (FIG. 1) are connected to one another and to the support plate 1 and pressure plate 2 by means of connectors 24 allowing them to be spaced apart from one another at a certain distance. The filter plates 3 are suspended by means of rollers 25 (FIG. 2) to a frame 26 of the filter press.

The above-described filter press has vertically extending filter plates 3. The same construction of the filter press may be used with the horizontally extending filter plates.

The filter press functions in the following manner.

Prior to the beginning of filtering, the set of the filter plates 3 is put together and clamped by means of the hydraulic cylinder 16 (FIG. 1) and pressure plate 2, whereafter suspension is fed, via the pipes 11 (FIG. 5) to the space 12, and suspension flows through the endless filtering belts 10 of each filter plate 3 to be admitted as filtrate to the chamber 7 and to be removed, via the passage 8, from the filter press. Solid phase of the suspension (precipitate) is deposited on the surface of the endless filtering belt 10. After the filtering of suspension, the precipitate is washed and dried by feeding, via the pipes 11, first, washing liquid and then drying gas. After completion of filtering and washing of the precipitate, it may be squeezed by the flexible membrane 13 (FIG. 3), if necessary, by feeding liquid or gas under pressure to the space 14. After drying of the precipitate, the hydraulic cylinder 16 (FIG. 1) is actuated to return the pressure plate 2 back to the extreme (left-hand) position as shown, and the filter plates 3 connected to the pressure plate are expanded in the manner of bellows so that they are spaced apart from one another at a certain distance defined by the connectors 24. In this position, the drive 21 is put on to displace downwardly, by means of the drive shafts 20 and chains 19, the bars 18, the rods 22 connected thereto (FIG. 4) and the outer runs 10b of the endless belts 10 connected to the rods 22 extending transversally of the filter plates 3, as shown in the drawing to remove the precipitate. During the removal, the rollers 9 need not necessarily be rotated, and the endless belt 10 may simply slide over them in case one or both rollers 9 are jammed. After completion of the precipitate removal, the bars 18 are returned back into the initial (upper) position, and the endless belts 10 are also returned back into the initial operative position.

If regeneration of the filtering surface of the endless belts 10 is required, the filter plates 3 are put together and clamped with the lowermost position of the bars 18. Thus the endless belts 10 are turned to face the draining barriers 6 of the filter plates 3 with their contaminated sides. In this position, the line for feeding suspension, that is the passages 11 and the chamber 12 (FIG. 5), is used for feeding regenerating liquid which flows through the endless belts 10 in the direction opposite to that of the flow of filtrate during filtering of suspension, thereby removing the residues of precipitate from contaminated surface of the endless belt 10. After completion of regeneration of the filtering surfaces, the filter press is opened and the bars 18 (FIG. 4), the rods 22 and endless belts 10 are returned back into the initial position. Then the set of the filter plates 3 is put together and clamped, whereafter next operating cycle of the filter press begins.

What is claimed is:

1. In a filter press, a support plate, a pressure plate, and a set of chamber-type filter plates situated between said support and pressure plates, each of said filter plates including an endless frame and a solid barrier surrounded by and fixed to said frame, each frame of each filter plate having a pair of opposed walls and each filter plate carrying a pair of rollers supported adjacent said opposed walls thereof, a flexible liquid-permeable fabric barrier in the form of an endless belt supported by said rollers of each filter plate with both runs of said belt situated on one side of each filter plate so that each belt has an inner run facing an inner surface of said solid barrier of each filter plate to define a filtering chamber therewith and an outer run facing an outer surface of a solid barrier of the next filter plate to define therewith a receiving chamber for receiving liquid which is to be filtered, said liquid passing through both runs of each endless belt into said filtering chamber of each filter plate to form a cake on said outer run of each endless belt, means connected with said pressure plate for displacing the latter toward said support plate to clamp said set of filter plates between said pressure plate and support plate, supply pipes communicating with said receiving chambers to transmit thereto liquid which is to be filtered and discharge pipes communicating with said filtering chambers to receive filtered liquid therefrom, said pressure plate being movable away from said support plate subsequent to a filtering operation so that said filter plates can be spaced from each other with filter cakes situated on the outer runs of said endless belts, and means operatively connected to each of the outer runs of said endless belts for simultaneously moving all of said endless belts around the rollers carried by each filter plate to remove the cake from the outer run of each endless belt, said means for moving said endless belts including a plurality of rods respectively extending across and fixed to the outer runs of said endless belts, said rods having ends projecting beyond said endless belts, and a pair of elongated bars situated at opposite sides of said filter plates and operatively connected with the ends of said rods, and drive means operatively connected with said bars for displacing the latter and said rods therewith away from one of the rollers of each filter plate and toward the other of the rollers thereof for displacing said endless belts around said rollers.

2. The combination of claim 1 and wherein said bars are in the form of hollow channels while said rods carry at their opposed ends rollers which are received in said channels.

* * * * *